United States Patent
Nakamura et al.

(10) Patent No.: US 9,588,518 B2
(45) Date of Patent: Mar. 7, 2017

(54) AUTONOMOUS MOBILE APPARATUS, CONTROL DEVICE, AND AUTONOMOUS MOBILE METHOD

(75) Inventors: Ryosuke Nakamura, Tokyo (JP); Azusa Amino, Tokyo (JP); Taishi Ueda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/401,615

(22) PCT Filed: May 18, 2012

(86) PCT No.: PCT/JP2012/062849
§ 371 (c)(1),
(2), (4) Date: Nov. 17, 2014

(87) PCT Pub. No.: WO2013/171905
PCT Pub. Date: Nov. 21, 2013

(65) Prior Publication Data
US 2015/0160654 A1    Jun. 11, 2015

(51) Int. Cl.
*G05D 1/00* (2006.01)
*G05D 1/02* (2006.01)
*B25J 5/00* (2006.01)

(52) U.S. Cl.
CPC .............. *G05D 1/021* (2013.01); *B25J 5/007* (2013.01); *G05D 1/024* (2013.01)

(58) Field of Classification Search
CPC ......... G08G 1/16; G08G 1/165; B25J 9/1676; B25J 11/0005; B25J 9/162; B25J 9/1666;
(Continued)

(56) References Cited

U.S. PATENT DOCUMENTS 5,307,271 A * 4/1994 Everett, Jr. .......... G05D 1/0038
                                                  180/169
6,351,273 B1 * 2/2002 Lemelson ............. G06F 3/0485
                                                  704/271
(Continued)

FOREIGN PATENT DOCUMENTS

JP    2006-35381 A     2/2006
JP    2006-263873 A   10/2006
(Continued)

OTHER PUBLICATIONS

International Search Report (PCT/ISA/210) dated Jun. 19, 2012 with English-language translation (Four (4) pages).

*Primary Examiner* — Khoi Tran
*Assistant Examiner* — Jorge Peche
(74) *Attorney, Agent, or Firm* — Crowell & Moring LLP

(57) ABSTRACT

A control device capable of providing smooth movement even in a crowded environment is to be provided. The control device includes a movement processing section (101) that creates a movement plan that is information relating to movement of an autonomous mobile apparatus (1); a movement control section (21) that moves the autonomous mobile apparatus (1) according to the movement plan created by the movement processing section (101); a congestion degree estimating section (102) that calculates the degree of congestion in a movement direction of the autonomous mobile apparatus (1); a visual field estimating section (103) that estimates a visual field of a moving obstacle when the degree of congestion on an immediately front side of the autonomous mobile apparatus (1) is a predetermined value or higher; and an attention calling control section (104) that calls attention using an attention calling device (15) to enter the estimated visual field.

10 Claims, 6 Drawing Sheets

(58) Field of Classification Search
CPC ........... B25J 5/007; G05B 2219/40202; G05D 1/021; G05D 1/024
USPC ...... 700/253, 255, 259; 701/23, 28, 49, 301, 701/302
See application file for complete search history.

(56) References Cited

U.S. PATENT DOCUMENTS

| | | | | |
|---|---|---|---|---|
| 8,235,529 B1* | 8/2012 | Raffle | ............. | A61B 3/113 351/209 |
| 9,100,540 B1* | 8/2015 | Gates | ............. | H04N 7/15 |
| 2002/0105482 A1* | 8/2002 | Lemelson | ............. | G06F 3/0485 345/7 |
| 2002/0175830 A1* | 11/2002 | Hudson | ............. | E01F 9/662 340/907 |
| 2004/0162637 A1* | 8/2004 | Wang | ............. | B25J 9/1689 700/245 |
| 2006/0095160 A1* | 5/2006 | Orita | ............. | G05D 1/027 700/248 |
| 2006/0106496 A1* | 5/2006 | Okamoto | ............. | G05D 1/0272 700/253 |
| 2007/0078566 A1* | 4/2007 | Wang | ............. | G06F 19/3437 700/259 |
| 2007/0198130 A1* | 8/2007 | Wang | ............. | G06F 19/3418 700/259 |
| 2008/0281467 A1* | 11/2008 | Pinter | ............. | H04L 63/029 700/245 |
| 2009/0055019 A1* | 2/2009 | Stiehl | ............. | B25J 9/1671 700/249 |
| 2009/0234499 A1* | 9/2009 | Nielsen | ............. | B25J 9/161 700/250 |
| 2010/0125799 A1* | 5/2010 | Roberts | ............. | G06F 3/011 715/757 |
| 2011/0054689 A1* | 3/2011 | Nielsen | ............. | G05D 1/0088 700/258 |
| 2011/0112839 A1* | 5/2011 | Funakoshi | ............. | G10L 15/083 704/249 |
| 2012/0096702 A1* | 4/2012 | Kingsley | ............. | B23P 23/04 29/561 |
| 2012/0274897 A1* | 11/2012 | Narasimha-Iyer | ..... | A61B 3/102 351/206 |
| 2013/0054377 A1* | 2/2013 | Krahnstoever | ......... | G09F 27/00 705/14.66 |
| 2013/0088605 A1* | 4/2013 | Quarfordt | ............. | H04L 67/1044 348/207.1 |
| 2013/0184980 A1* | 7/2013 | Ichikawa | ............. | B25J 9/1676 701/301 |
| 2014/0031981 A1* | 1/2014 | Fernando | ............. | G05D 1/024 700/253 |
| 2014/0184550 A1* | 7/2014 | Hennessey | ............. | G06F 3/013 345/173 |
| 2014/0347265 A1* | 11/2014 | Aimone | ............. | G09G 3/003 345/156 |
| 2015/0160654 A1* | 6/2015 | Nakamura | ............. | G05D 1/024 701/23 |

FOREIGN PATENT DOCUMENTS

| | | | | |
|---|---|---|---|---|
| JP | 2007-229814 A1 * | 9/2007 | ............. | B25J 13/08 |
| JP | 2011-143511 A | 7/2011 | | |
| JP | 2011-204145 A | 10/2011 | | |
| JP | 4793904 B2 | 10/2011 | | |
| JP | WO 2012039280 A1 * | 3/2012 | ............. | B25J 9/1676 |
| WO | WO 2012/039280 A1 | 3/2012 | | |

* cited by examiner

FIG. 1A
SIDE VIEW
FIG. 1B
FRONT VIEW
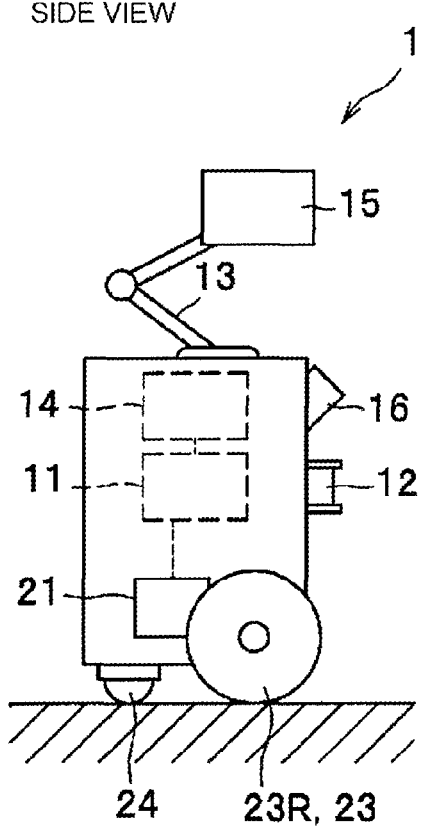
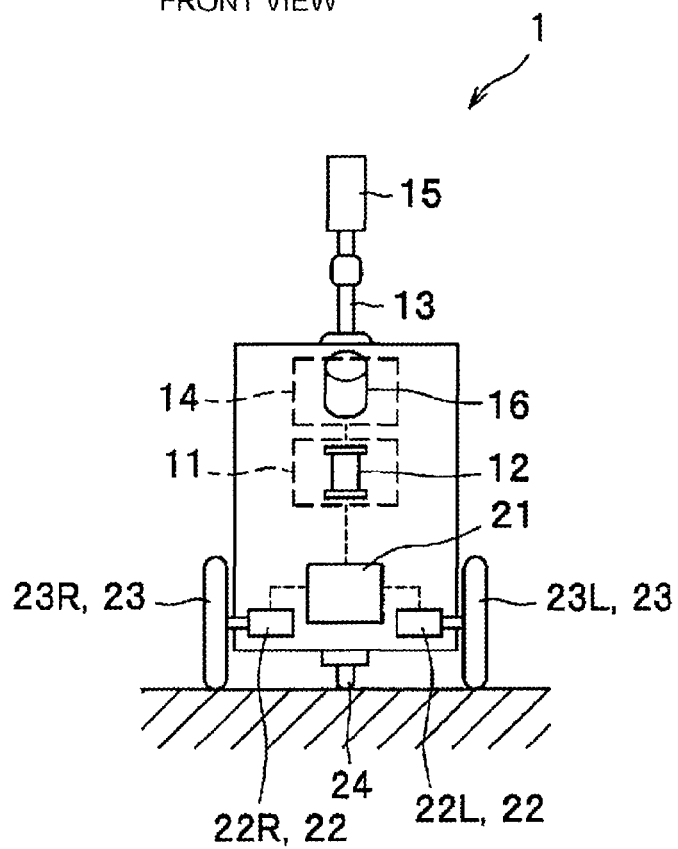
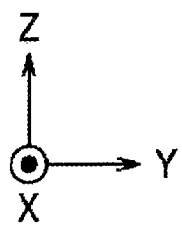
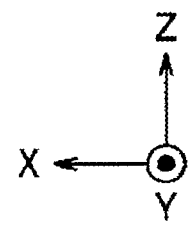

ROW OF TURNED-ON LEDS MOVES

AUTONOMOUS MOBILE APPARATUS, CONTROL DEVICE, AND AUTONOMOUS MOBILE METHOD

TECHNICAL FIELD

The present invention relates to a technique of an autonomous mobile apparatus that performs an autonomous movement in a crowded environment, and a control device and an autonomous mobile method.

BACKGROUND ART

In the related art, PTL 1 discloses a technique relating to a mobile body having an autonomous mobile ability in a crowded environment.

In the technique disclosed in PTL 1, a communication robot may determine the degree of congestion of persons, and may perform communication for concentrating or loosening the persons according to the degree of congestion.

CITATION LIST

Patent Literature

PTL 1: Japanese Patent No. 4793904

Non Patent Literature

NPL 1: Miura Toshiaki, "External world information acquisition and processing method", Mathematical Sciences, vol. 30, no. 12, 1992, pp. 53-58

SUMMARY OF INVENTION

Technical Problem

When an autonomous mobile apparatus moves among crowded persons, it is necessary that the autonomous mobile apparatus avoid a moving obstacle (here, a passerby). In the operation of the autonomous mobile apparatus for avoiding the moving obstacle, the autonomous mobile apparatus estimates a movement direction and a movement velocity of the moving obstacle when avoiding the moving obstacle. Further, the autonomous mobile apparatus plans a route and a velocity of the autonomous mobile apparatus so as to avoid the moving obstacle, and moves according to the plan. When the autonomous mobile apparatus moves, it is preferable that a movement change of the moving obstacle be suppressed to the minimum, and that the autonomous mobile apparatus rapidly move to a target place.

The technique disclosed in PTL 1 can easily perform the obstacle avoidance due to loosening of the congestion. However, in a crowded environment, as shown in NPL 1, a visual field of a person becomes narrow. Accordingly, with only gestures as in the technique disclosed in PTL 1, it is difficult for the autonomous mobile apparatus to establish communication with the passerby. Further, since sound is also heard by persons other than a person that is an avoidance target, the sound may attract attention of persons that are not directly related to the avoidance. Accordingly, urging the passerby into the avoidance by issuing the sound is not preferable in view of the purpose of suppressing the movement change of the persons to the minimum.

In order to solve the above problems, an object of the invention is to provide a technique capable of performing smooth movement even in a crowded environment.

Solution to Problem

According to an aspect of the invention, there is provided an autonomous mobile apparatus that estimates a visual field of a moving obstacle when the degree of congestion on an immediately front side of the autonomous mobile apparatus is a predetermined value or higher, and calls attention using an attention calling device to enter the estimated visual field.

Other solutions are appropriately described in embodiments.

Advantageous Effects of Invention

According to the invention, it is possible to perform smooth movement even in a crowded environment.

BRIEF DESCRIPTION OF DRAWINGS

FIG. 1A and FIG. 1B are diagrams illustrating a configuration example of an autonomous mobile apparatus according to an embodiment.

DESCRIPTION OF EMBODIMENTS

Figure 2:
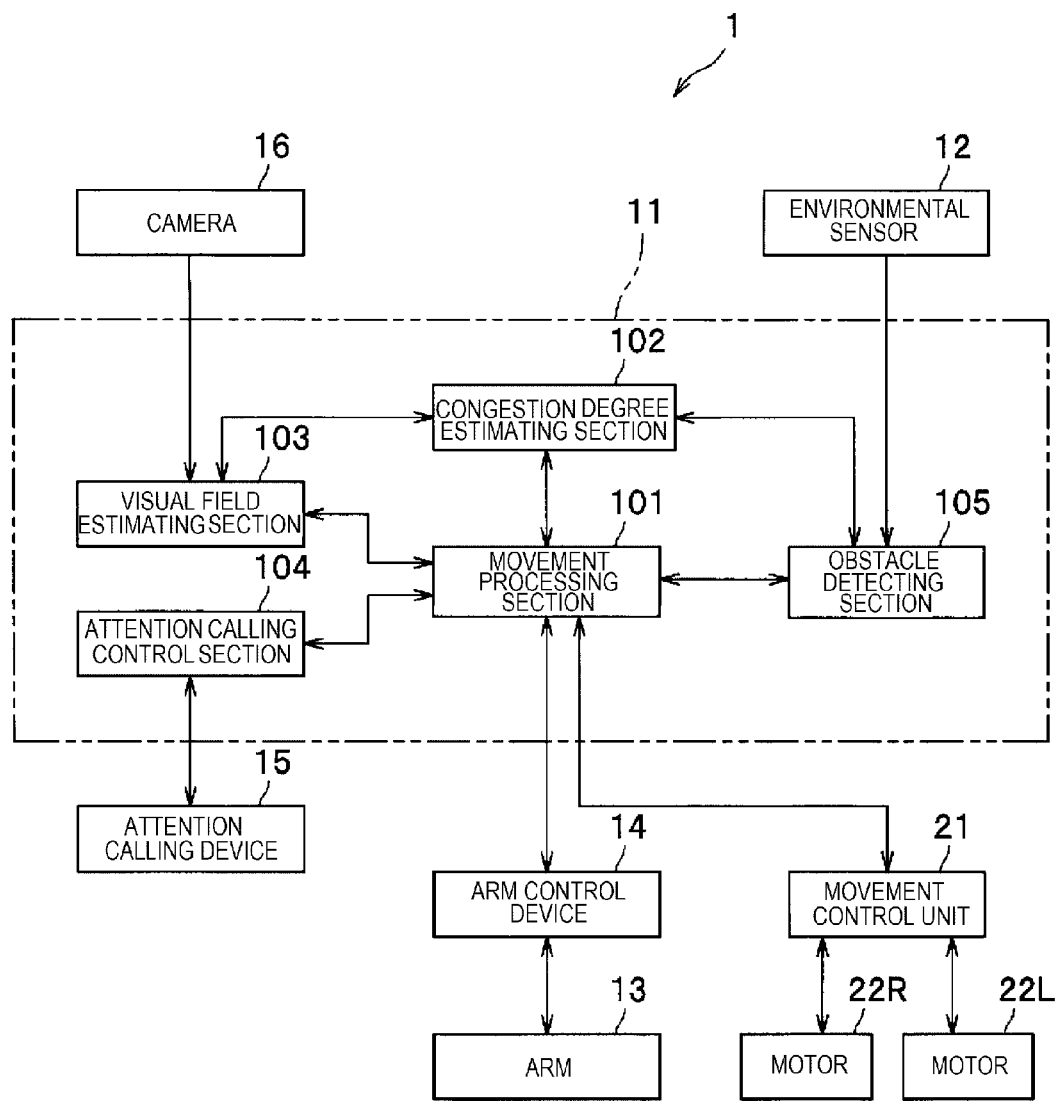
FIG. 2 is a diagram illustrating function blocks in an autonomous mobile apparatus according to an embodiment.

Hereinafter, an embodiment of the invention will be described in detail by appropriately referring to the accompanying drawings. In the present embodiment, it is assumed that a "moving obstacle" mainly refers to a "passerby".

[Autonomous Mobile Apparatus]

FIG. 1 is a diagram illustrating a configuration example of an autonomous mobile apparatus according to the present embodiment, in which FIG. 1 (a) is aside view of the autonomous mobile apparatus, and FIG. 1(b) is a front view of the autonomous mobile apparatus.

As shown in FIGS. 1(a) and 1(b), an autonomous mobile apparatus 1 includes a pair of wheels 23 (23R, 23L) that is coaxially provided on left and right sides, a movement control unit 21, and motors 22 (22R, 22L) that are respectively connected to the wheels 23 (23R, 23L). Further, the autonomous mobile apparatus 1 includes a caster 24 for free direction change on a rear side in an advancing direction. The motors 22R and 22L are connected to the movement control unit 21, and are controlled to generate a predetermined wheel rotational angular velocity. Further, the movement control unit 21 acquires a rotational velocity and a rotational angular velocity of the wheels 23 (23R, 23L) through the motors 22 (22R, 22L).

Further, the autonomous mobile apparatus 1 includes a processing unit 11 that performs an operation, an environmental sensor 12 that measures an environmental situation, an arm 13 that is disposed in an upper part of a main body, an arm control device 14, an attention calling device 15, and a camera 16 that estimates a visual field of a person. For example, the arm 13 basically has three degrees of freedom including an angle in a z-axis direction, an angle between an upper part of the arm and the attention calling device 15, and an angle between the upper part of the arm 13 and a lower part of the arm 13, and two degrees of freedom including a rotational degree of freedom between the upper part of the arm 13 and the lower part of the arm 13 and a rotational degree of freedom between the upper part of the arm 13 and the attention calling device 15, that is, has a total of five degrees of freedom. When receiving an input of the position and posture of the attention calling device 15 provided at a tip of the arm control device 14 from the processing unit 11, the arm control device 14 controls the arm 13. The attention calling device 15 performs a process of calling attention of the moving obstacle (passerby).

The environmental sensor 12 is a sensor that observes an external situation of the autonomous mobile apparatus 1, which may measure a distance to a peripheral object in a two-dimensional or three-dimensional manner using a laser scanner, for example.

[Functional Block Diagram]

FIG. 2 is a diagram illustrating function blocks in the autonomous mobile apparatus according to the present embodiment. In FIG. 2, the same reference numerals are assigned to the same components as in FIG. 1, and the description will not be repeated.

The processing unit 11 includes a movement processing section 101, a congestion degree estimating section 102, a visual field estimating section 103, an attention calling control section 104, and an obstacle detecting section 105. Further, the processing unit 11 is connected to the environmental sensor 12, the arm control device 14, the attention calling device 15, the camera 16, and the movement control unit 21.

The movement processing section 101 creates a movement plan including a route plan and a velocity plan based on information acquired from the obstacle detecting section 105 or the congestion degree estimating section 102, and allows the movement control unit 21 to perform the movement of the autonomous mobile apparatus 1. Further, when a current position is crowded, the movement processing section 101 performs a control for allowing the arm control device 14 to extend the arm 13 and allowing the attention calling device 15 to call attention. In addition, the movement processing section 101 notifies the visual field estimating section 103 of a direction for visual field estimation.

The congestion degree estimating section 102 estimates the degree of congestion based on information acquired from the environmental sensor 12 or information acquired from the obstacle detecting section 105, and transmits the estimation result to the movement processing section 101 or the visual field estimating section 103.

The visual field estimating section 103 estimates a visual field of the moving obstacle (passerby) in the direction notified from the movement processing section 101 based on an image acquired from the camera 16 or the degree of congestion acquired from the congestion degree estimating section 102, and transmits the estimation result to the movement processing section 101.

The obstacle detecting section 105 detects an obstacle based on information of the environmental sensor 12, and transmits the detection result to the movement processing section 101 or the congestion degree estimating section 102.

[Hardware Configuration]

Figure 3:
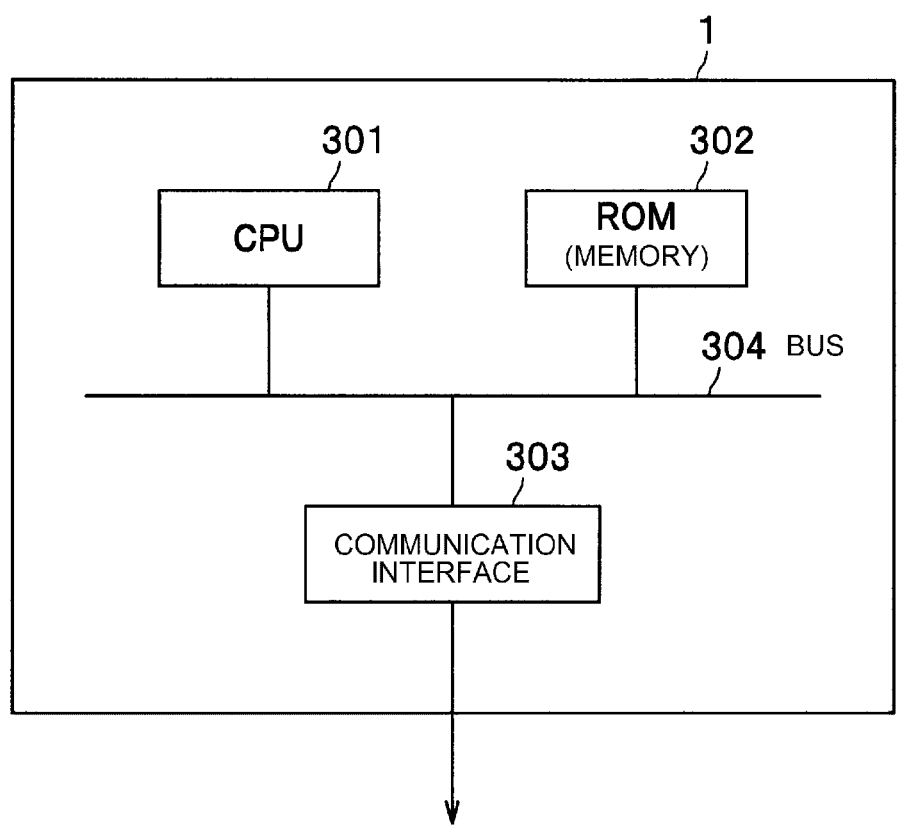
FIG. 3 is a diagram illustrating a hardware configuration of a processing unit according to an embodiment.

FIG. 3 is a diagram illustrating a hardware configuration of the processing unit according to the present embodiment.

The processing unit 11 includes a central processing unit (CPU) 301, a read only memory (ROM) 302 that is a memory, and a communication interface 303 that performs communication with an external device, which are connected to each other through a bus 304.

The processing unit 11 and the respective sections 101 to 105 in FIG. 2 are realized as a program stored in the ROM 302 is executed by the CPU 301.

[Flowchart]

(Movement Processing)

Figure 4:
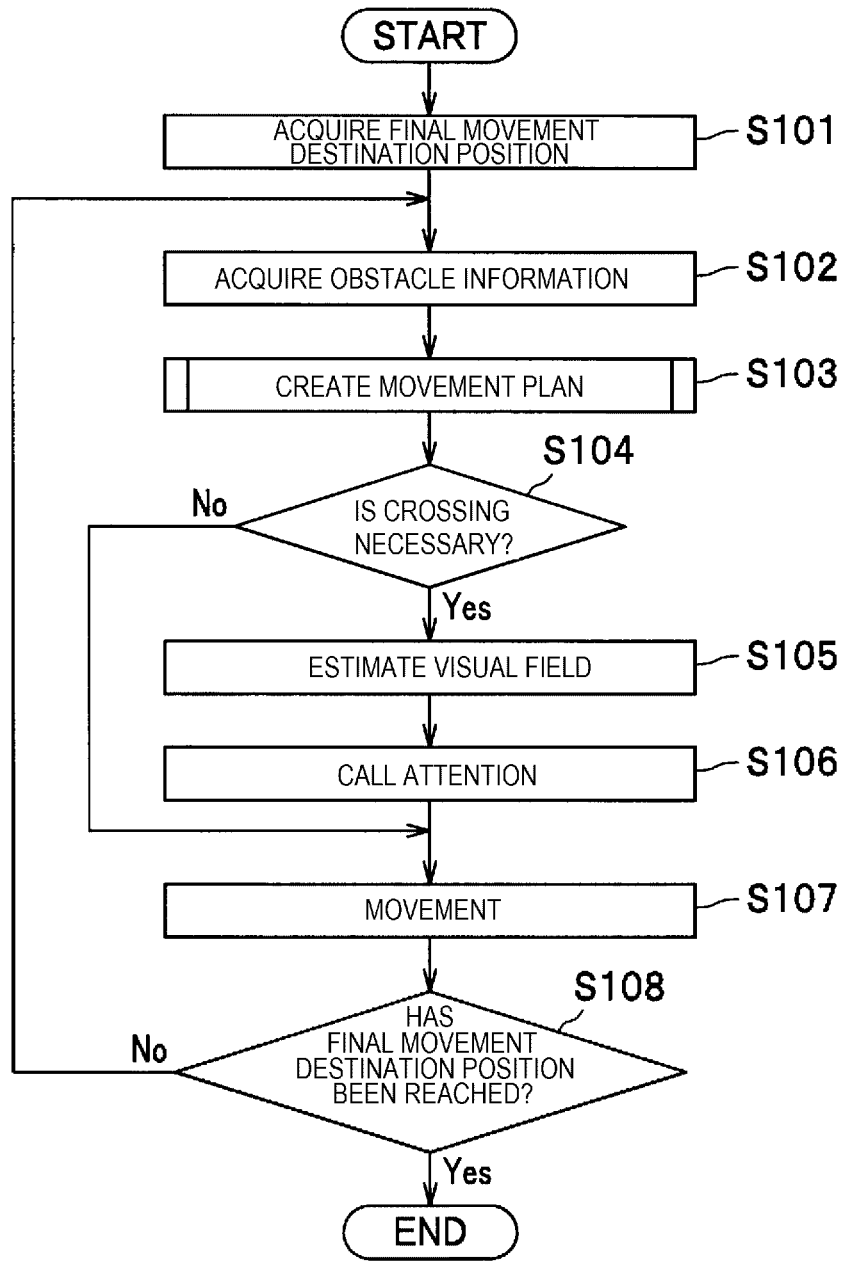
FIG. 4 is a flowchart illustrating a procedure of movement processing of an autonomous mobile apparatus according to an embodiment.

FIG. 4 is a flowchart illustrating a procedure of movement processing of the autonomous mobile apparatus according to the present embodiment.

First, the movement processing section 101 acquires a final movement destination position that is set in advance, is determined by a program, or is input by a person, from the memory (S101).

Then, the movement processing section 101 acquires obstacle information including the position, the velocity, or the like of the obstacle from the obstacle detecting section 105 (S102). Here, the obstacle of which the information is acquired includes both a stationary obstacle and a moving obstacle.

Here, the detection process of the obstacle in the obstacle detecting section 105 will be described. As an obstacle calculation technique, for example, a technique disclosed in JP-A-2008-65755 may be used.

This technique is performed in the following order.

(a1) The obstacle detecting section 105 detects a rapid change point of a distance value obtained from a laser scanner that is the environmental sensor 12 with respect to an angle at a certain time t.

(a2) The obstacle detecting section 105 divides a data sequence into segments for each group of continuous points based on the detected change point. Thus, the obstacle detecting section 105 obtains a characteristic amount of each segment, such as a representative position such as a center, or a shape at the time t.

(a3) The obstacle detecting section 105 performs the same process at a time t+Δt to obtain a characteristic amount of each segment.

(a4) The obstacle detecting section 105 compares the characteristic amount of the segment obtained at the time t and the characteristic amount of the segment obtained at the time t+Δt, and recognizes that the segments of which the characteristic amounts are close to each other represent the same obstacle.

(a5) The obstacle detecting section 105 calculates the velocity of the obstacle from a change amount of the representative positions of the recognized segments that represent the same obstacle between the time t and the time t+Δt.

(a6) The obstacle detecting section 105 calculates coordinates of the center of a circle inscribed in a shape obtained from a data sequence of an obstacle recognized as the same obstacle.

(a7) The obstacle detecting section 105 recognizes that an obstacle of which the movement velocity is approximately zero is a stationary obstacle. Here, information relating to all the obstacles is stored once in the memory. Further, the obstacle detecting section 105 considers each data point obtained from the obstacle recognized as the stationary obstacle using the laser scanner as an obstacle having a width of 0. That is, the obstacle detecting section 105 deletes the stationary obstacle.

By performing the above processes, the obstacle detecting section 105 detects the positions, velocities, and shapes of singular or plural moving obstacles.

Since the obstacle detecting section 105 executes the processes of (a1) to (a7) for each segment, the obstacle detecting section 105 can detect plural obstacles.

The description returns to FIG. 3.

Then, the movement processing section 101 creates a movement plan for a movement destination position, including a route plan and a velocity plan (S103). The process of step S103 will be described later with reference to FIG. 5. Here, the autonomous mobile apparatus 1 does not move to the final movement destination position that is a final arrival destination at a time, but moves to the final movement destination position while repeating arrival at the plural movement destination positions.

The movement processing section 101 determines whether it is necessary for the autonomous mobile apparatus 1 to cross an immediately front side of the moving obstacle based on the movement plan created in step S103 and the obstacle information acquired in step S102 (S104).

As the determination result in step S104, if it is not necessary for the autonomous mobile apparatus 1 to cross the immediately front side of the moving obstacle (No in S104), the processing unit 11 causes the procedure to proceed to step S107.

As the determination result in step S104, if it is necessary for the autonomous mobile apparatus 1 to cross the immediately front side of the moving obstacle (Yes in S104), the movement processing section 101 notifies the visual field estimating section 103 of a direction where the moving obstacle of which the immediately front side is crossed is present. The visual field estimating section 103 estimates a visual field of the moving obstacle (passerby) that is present in the notified direction based on the image acquired by the camera 16 (S105).

Here, the visual field estimation process in the visual field estimating section 103 will be described.

There are various methods for estimating a gaze direction of the moving obstacle (passerby), and for example, a technique disclosed in [Aoyama Koji, Yamamura Takeshi, Ohnishi Noboru, Sugie Noboru, 'Estimation of face and gaze direction using single camera 16', IEICE technology research report, PRU, Pattern recognition and understanding, 95 (583), pp. 131-136] may be used. The technique disclosed in this document is performed in the following order.

(b1) The visual field estimating section 103 extracts the width of the face, the pupils, and the eyeballs from an image acquired from the camera 16 using template matching stored in a storage section in advance, and calculates an approximate face direction from the positions thereof.

(b2) The visual field estimating section 103 compares an image obtained by rotating, in the vicinity of an estimated value, an image obtained by matching the eyes and the mouth with a three-dimensional model with an original image to perform direction correction, thereby calculating an accurate face direction.

(b3) The visual field estimating section 103 calculates a rotational angle of the eyeballs using an eyeball model.

(b4) The visual field estimating section 103 adds the rotational angle of the eyeballs calculated in the process of (b3) to the face direction (unit: angle) calculated in the process of (b2). Thus, the visual field estimating section 103 can calculate the gaze direction of the moving obstacle (passerby).

(b5) The visual field estimating section 103 determines the width of the visual field of the moving obstacle (passerby) based on the degree of congestion in the gaze direction acquired from the congestion degree estimating section 102, using the calculated gaze direction as an axis, to calculate a visual field region of the moving obstacle. The width of the visual field region is narrow as the degree of congestion in the gaze direction is high, and is broad as the degree of congestion is low, as disclosed in NPL 1.

The description returns to FIG. 3.

When the estimation result of the visual field is received from the visual field estimating section 103, the movement processing section 101 gives an instruction to the arm control device 14 to extend the arm 13 so that the attention calling device 15 comes within the visual field of the moving obstacle (passerby) of which the immediately front side is crossed. Then, the attention calling device 15 calls attention (S106). Here, it is preferable that the movement processing section 101 allow the arm 13 to be extended so that the attention calling device 15 comes within the visual field estimated in step S106. Thus, the height or the like of the moving obstacle (passerby) can be considered, and thus, the reliability of calling attention can be enhanced. The attention calling in step S106 will be described later with reference to FIGS. 6 and 7.

Then, the movement processing section 101 gives an instruction to the movement control unit 21 to control the autonomous mobile apparatus 1 so that the autonomous mobile apparatus 1 follows the route plan and the velocity plan included in the movement plan created in step S103. The movement control unit 21 that is given the instruction moves the autonomous mobile apparatus 1 (S107).

Subsequently, the movement processing section 101 determines whether the autonomous mobile apparatus 1 arrives at the final movement destination position (S108). In step S108, the movement processing section 101 determines whether a distance between the current position of the autonomous mobile apparatus 1 acquired from the movement control unit 21 and the final movement destination position is smaller than a predetermined value.

As the determination result in step S108, if the autonomous mobile apparatus 1 does not arrive at the final movement destination position (No in S108), the processing unit 11 returns the procedure to step S102.

As the determination in step S108, if the autonomous mobile apparatus 1 arrives at the final movement destination position (Yes in S108), the processing unit 11 finishes the movement processing.

When the autonomous mobile apparatus 1 passes the immediately front side of the moving obstacle (passerby), it is preferable that the movement control unit 21 reduce the velocity for passage.

Here, a movement method of the autonomous mobile apparatus 1 using the movement control unit 21 will be described.

The movement control unit 21 calculates a current position $P(t_0)$ based on rotational angles $\phi_R$ and $\phi_L$ and rotational angular velocities $d\phi_R$ and $d\phi_L$ of the wheels 23 acquired by the motors 22R and 22L. Here, the movement control unit 21 calculates the position at a current time $t_0$ using Expression (1).

[Expression 1]

$$p(t_0) = (\int_0^{t_0} v(t)\cos\omega(t)dt, \int_0^{t_0} v(t)\sin\omega(t)dt)$$

$$v(t) = (d\phi_R(t) + d\phi_L(t))/2$$

$$\omega(t) = \int_0^{t_0} d\omega(t)dt$$

$$d\omega(t) = h(d\phi_L(t) - d\phi_R(t))/f \quad (1)$$

In Expression (1), t represents a time, in which t=0 represents an initial state. Further, the wheel angles $\phi_R$ and $\phi_L$ and rotational angular velocities $d\phi_R$ and $d\phi_L$ are represented as functions of t. Furthermore, f represents an interval between the wheel 23R and the wheel 23L, and h represents a wheel radius. ω represents a slewing angle of the autonomous mobile apparatus 1, dω represents a slewing angular velocity thereof, and v represents a movement velocity thereof. The movement control unit 21 may perform a feedback control according to the current position, the route plan and the velocity plan to move the autonomous mobile apparatus 1 according to the movement plan.

(Creation of Movement Plan)

Figure 5:
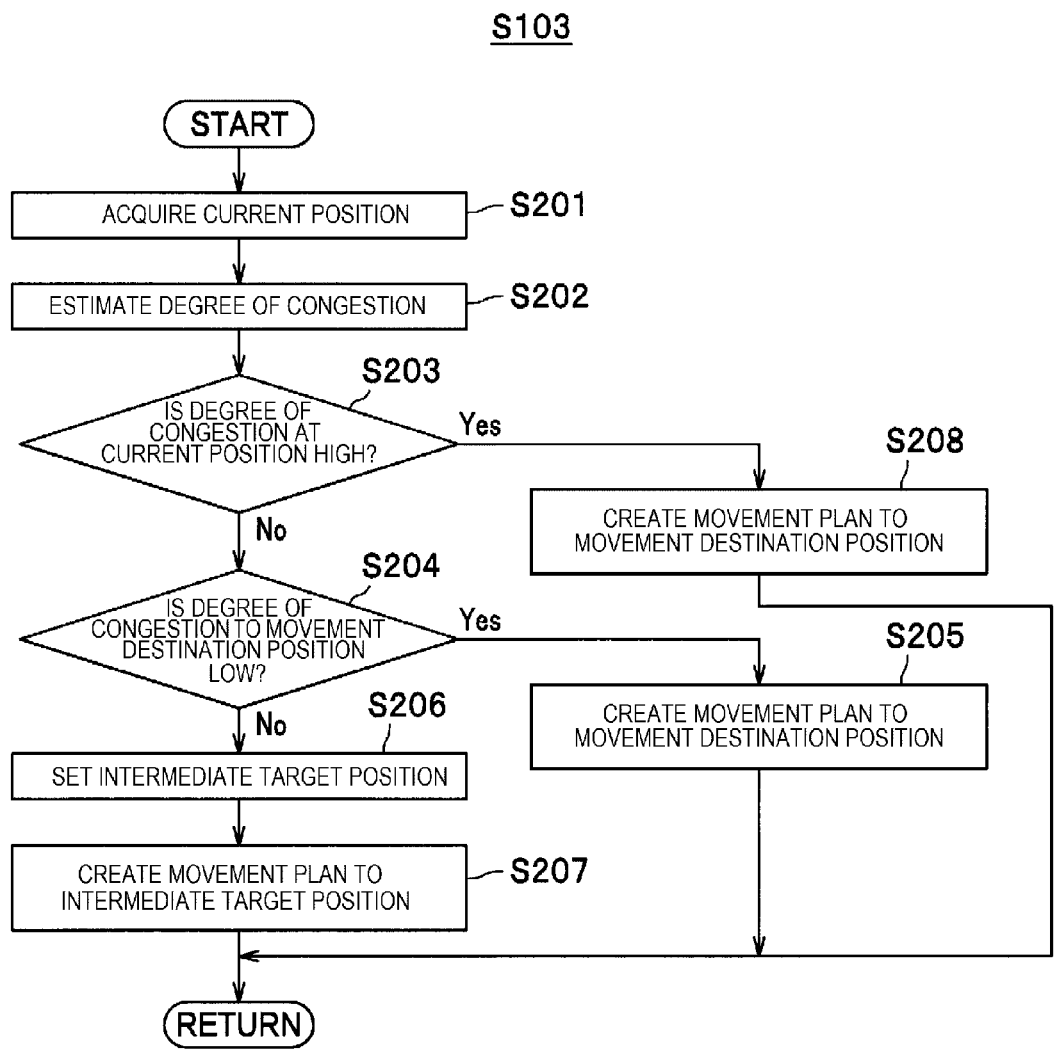
FIG. 5 is a flowchart illustrating a procedure of a movement plan creation and movement start process.

FIG. 5 is a flowchart illustrating a procedure of a movement plan creation and movement start process in step S103 in FIG. 4.

In the process shown in FIG. 5, the movement processing section 101 avoids the moving obstacle by the route plan (that is, changes the movement route) in a place where the degree of congestion is low, and changes the velocity plan (that is, changes the velocity) in a place where the degree of congestion is high to create a movement plan for arriving at a movement destination position.

First, the movement processing section 101 acquires the current position from the movement control unit 21 (S201).

Then, the congestion degree estimating section 102 estimates the degree of congestion (S202).

Here, the congestion degree estimation process by the congestion degree estimating section 102 will be described.

The congestion degree estimation process is performed in the following order, for example.

(c1) The congestion degree estimating section 102 acquires an effective range where sensing of the environmental sensor 12 is possible (referred to as a sensible range) from the environmental sensor 12, and acquires the position, the shape and the velocity of the obstacle detected from the obstacle detecting section 105.

(c2) The congestion degree estimating section 102 estimates the degree of congestion by a ratio of an exclusive area of the obstacle in the sensible range to the area of a region instructed from the movement processing section 101. Here, the region instructed from the movement processing section 101 refers to a region having a width that is set in advance with reference to the route. This width may be the width of the autonomous mobile apparatus 1. Here, when the region instructed from the movement processing section 101 is represented as A, and the occupation area of the obstacle is represented as B, the ratio of the exclusive area of the obstacle to the area of the region instructed from the movement processing section 101 is (A^B)/A.

Here, the obstacle includes both a moving obstacle and a stationary obstacle.

(c3) The congestion degree estimating section 102 acquires the movement plan from the movement processing section 101, and has the width of the autonomous mobile apparatus 1 with reference to the route.

(c4) The congestion degree estimating section 102 estimates the degree of congestion using the detected ratio of the exclusive area of the obstacle with respect to each region divided in a length direction of the route.

The ratio of the exclusive area of the detected obstacle with respect to respective regions divided in the route length direction is as follows. When the region instructed from the movement processing section 101 is represented as A as mentioned above, respective regions divided in the length direction of the route form the region A and are represented as Ai (i=1, 2, . . . , n). Here, the relation of ΣAi=A is established. Thus, the ratio of the exclusive area of the detected obstacle in each region divided in the route length direction becomes (Ai^B)/Ai. This is an index of the degree of congestion in each region Ai.

The description returns to FIG. 5.

The movement processing section 101 acquires the degree of congestion in a region immediately in front of the autonomous mobile apparatus 1 from the congestion degree estimating section 102 as the degree of congestion at the current position. Further, the movement processing section 101 compares the degree of congestion at the current position with a setting value to determine whether the degree of congestion at the current position is higher than the setting value (S203).

As the determination result in step S203, if the degree of congestion at the current position is lower than the setting value (No in S203), the movement processing section 101 creates a virtual route that linearly connects the current position and the movement destination position. Further, the movement processing section 101 acquires the degree of congestion on the virtual route from the congestion degree estimating section 102. This is performed as the movement processing section 101 divides the virtual route into predetermined regions, transmits division information to the congestion degree estimating section 102, and receives the degree of congestion of each region obtained as a result. Then, the movement processing section 101 compares the degree of congestion of each region with the setting value to determine whether a region having a high degree of congestion is present in the regions. That is, the movement processing section 101 determines whether the degree of congestion up to the movement destination position is low (S204, the degree of congestion: low). Here, the movement processing section 101 determines whether the degree of congestion is low in all the regions up to the movement destination position.

As the determination result in step S204, if the region having a high degree of congestion is not present, that is, if the degree of congestion is low in all the regions up to the movement destination position (Yes in S204), the movement processing section 101 creates a movement plan including a route plan and a velocity plan up to the movement destination position (S205).

As the determination result in step S204, if the region having a high degree of congestion (crowded region) is present, that is, if the degree of congestion is not low in all the regions up to the movement destination position (No in S204), the movement processing section 101 sets an intermediate target position different from the movement destination position in front of the region having a high degree of congestion on the virtual route (S206). It is assumed that the intermediate target position is a region in front of the region having a high degree of congestion (crowded region). The intermediate target position serves as a new movement destination position.

Then, the movement processing section 101 creates a movement plan including a route plan and a velocity plan up to the intermediate target position (new movement destination position) (S207).

Meanwhile, as the determination result in step S203, if the degree of congestion at the current position is higher than the setting value (Yes in S203), the movement processing section 101 creates a movement plan including a route plan and a velocity plan up to the movement destination position (S208). That is, since the current position is crowded, the movement processing section 101 calls attention in step S106 in FIG. 4 so that the moving obstacle (passerby) avoids the autonomous mobile apparatus 1, and then performs its movement. Further, in step S208, the movement processing section 101 issues a flag for performing the determination of "Yes" in step S104 in FIG. 4. Here, the issue of the flag has the following meaning. The performance of the process of step S208 means that the determination in step S203 is "Yes", that is, that the immediately front side of the autonomous mobile apparatus 1 is crowded. Accordingly, the performance of the process of step S208 means that the autonomous mobile apparatus 1 is present in a situation where the autonomous mobile apparatus should cross the immediately front side of the moving obstacle (passerby) in step S104 in FIG. 4 (that is, that the determination in step S104 is "Yes"). Accordingly, when performing the process of step S208, the movement processing section 101 issues the flag for determining that the autonomous mobile apparatus 1 passes the immediately front side of the moving obstacle (passerby) in step S104 in FIG. 4.

The regions of the movement plans created in steps S205 and S207 have a low degree of congestion, and are thus regions through which the autonomous mobile apparatus 1 is sufficiently movable using a generally known obstacle avoidance technique. For example, the movement processing section 101 creates a movement plan including an avoidance route plan using a technique disclosed in JP-A-2008-65755.

Further, when creating the movement plan in step S208, the movement processing section 101 may create a route for avoiding the obstacle. However, the movement processing section 101 may fail in the creation of the route for avoiding the obstacle. In this case, the movement processing section 101 may create a route that linearly connects the movement destination position and the current position, and may estimate a contact time t, with respect to the obstacle as the closest time t that satisfies the following Expression (2).

[Expression 2]

$$w > \|(p(0) + V_{ref}(t)t) - (P_0(0) + V_0 t)\| \quad (2)$$

Here, $\|\cdot\|$ represents a norm, in which it is assumed that the time "0" is a current time. Further, $V_0$ represents the movement velocity of the obstacle acquired by the obstacle detecting section 105, and P(t) represents a current position of the autonomous mobile apparatus 1 at the time t. Furthermore, $P_0(t)$ represents a central position of the obstacle, and ω represents a value obtained by adding a predetermined distance to the radius of an inscribed circle of the obstacle. $V_{ref}$ represents a current velocity plan. When $V_{ref}$ is not initially set, a predetermined maximum velocity A may be used instead of $V_{ref}$.

The movement processing section 101 determines the maximum velocity Vmax according to the contact time $t_c$ obtained by Expression (1), and creates the velocity plan $V_{ref}(t)$ using a predetermined acceleration E as shown in Expression (3).

[Expression 3]

$$\begin{cases} V_{ref} = A & t_c > D \\ V_{ref} = A \times \max(\ B(t_c - C), 0) & t_c \leq D \\ V_{ref} = 0 & P(0) = R \end{cases} \quad (3)$$

Here, B, C and D represent a predetermined positive weighting factor, a remaining time up to collision, and a safety distance, respectively. R represents the movement destination position.

[Attention Calling Device]

Figure 6:
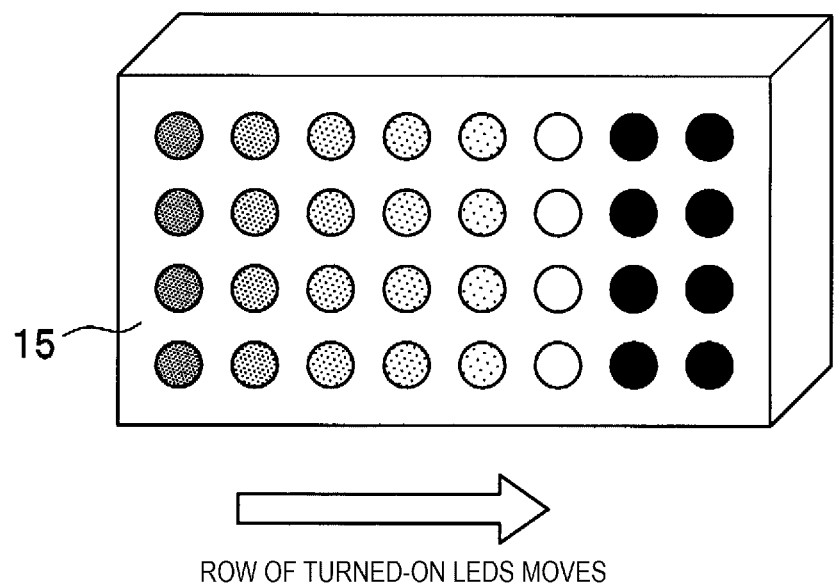
FIG. 6 is a diagram illustrating an example of an attention calling device according to an embodiment.
Figure 7:
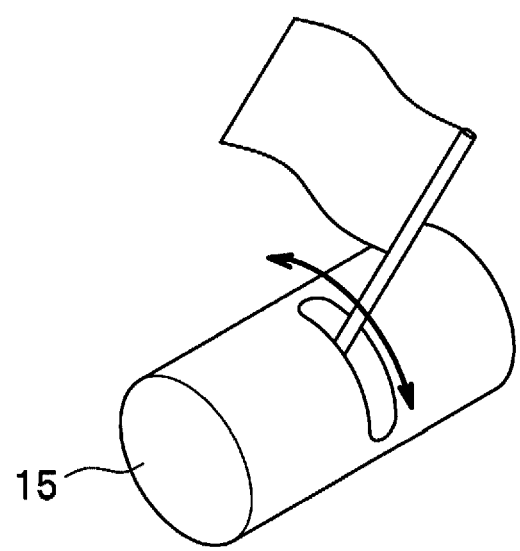
FIG. 7 is another diagram illustrating an example of an attention calling device according to an embodiment.

FIGS. 6 and 7 are diagrams illustrating an example of the attention calling device according to the present embodiment.

The attention calling control section 104 acquires the velocity plan from the movement processing section 101, calculates an average velocity from a current time to a predetermined future time, and gives an attention calling instruction to the attention calling device 15.

The attention calling device 15 may be provided as an LED (Light Emitting Diode) array in which LEDs are arranged, for example, as shown in FIG. 6. When the attention calling device 15 is provided as the LED array, the attention calling device 15 may turn on the LEDs according to the velocity of the autonomous mobile apparatus 1 in a direction along the advancing direction of the autonomous mobile apparatus 1 to notify the moving obstacle (passerby) of the movement plan of the autonomous mobile apparatus 1. That is, the attention calling control section 104 changes phases of light and darkness of the individual LEDs in the LED array (attention calling device 15) while deviating the phases at a specific cycle so that groups of the LEDs that are turned on and off are moved in a predetermined direction. That is, a row of the turned-on LEDs in the LED array is moved. Further, the attention calling control section 104 changes a movement velocity of the groups of the on-and-off LEDs in the LED array in proportion to the average velocity of the autonomous mobile apparatus 1. Here, it is preferable that the movement direction of the groups of the on-and-off LEDs match the movement direction of the autonomous mobile apparatus 1.

Further, the attention calling device 15 may have a configuration in which a movable part is provided to a support part, as shown in FIG. 7, instead of the LED array shown in FIG. 6. In FIG. 7, as a flag provided in the support part waves, the attention calling device 15 calls attention to the moving obstacle (passerby), but the invention is not limited thereto. For example, the attention calling device 15 may be configured to wave laterally at a velocity depending on the velocity of the autonomous mobile apparatus 1. In this case, the attention calling device 15 moves the movable part at a velocity proportional to the average velocity of the autonomous mobile apparatus 1 along the movement direction of the autonomous mobile apparatus 1 to call attention to the moving obstacle (passerby).

As shown in FIG. 7, when the attention calling device 15 has the configuration including the movable part, it is preferable that the support part to which the flag or the like is provided be telescopic, and that the attention calling device 15 extend the support part to enter the visual field of the moving obstacle (passerby).

The attention calling device 15 is not limited to the examples shown in FIGS. 5 and 6, and for example, may have a configuration of a telescopic rod shape as long as it can call attention to the moving obstacle (passerby).

Further, an example in which the attention calling device 15 provides the information relating to the advancing direction and the velocity of the autonomous mobile apparatus 1 to the moving obstacle is described, but the information may not be provided.

Alternatively, the attention calling device 15 may provide both the advancing direction and the velocity of the autonomous mobile apparatus 1, or may provide either one thereof.

The autonomous mobile apparatus 1 according to the present embodiment notifies the moving obstacle of the passage of the autonomous mobile apparatus 1 using the attention calling device 15 even in a crowded environment where the movement destination position is present on a side to which the row of the moving obstacles is directed and the avoidance of the obstacle is impossible. Thus, the autonomous mobile apparatus 1 according to the present embodiment can smoothly move even in a situation of a high degree of congestion.

Further, when passing the front side of the moving obstacle, the autonomous mobile apparatus 1 according to the present embodiment allows the attention calling device 15 to provide the information relating to the advancing direction and the velocity of the autonomous mobile apparatus 1 to the moving obstacle. In this way, the autonomous mobile apparatus 1 according to the present embodiment can advance at a reduced velocity while calling attention of the moving obstacle to perform the movement with less influence on the row of the moving obstacles.

Furthermore, the autonomous mobile apparatus 1 according to the present embodiment estimates the visual field of the moving obstacle of which the immediately front side is crossed and extends the attention calling device 15 to enter the visual field, to thereby make it possible to enhance the reliability of calling attention to the moving obstacle.

In addition, the autonomous mobile apparatus 1 according to the present embodiment calls attention only when crossing the immediately front side of the moving obstacle without constantly calling attention, to thereby make it possible to suppress wasteful attention calling and to suppress power consumption of a battery. That is, the autonomous mobile apparatus 1 according to the present embodiment can efficiently call attention.

In the present embodiment, the environmental sensor 12 is provided in the autonomous mobile apparatus 1, but may be provided outside the autonomous mobile apparatus 1, for example, in the external camera 16 or the like.

The invention is not limited to the above-described embodiment, and includes various modifications. For example, since the above-described embodiment is described in detail for easy understanding of the invention, the invention is not necessarily provided with all of the above-described configurations.

For example, in the present embodiment, the processes shown in FIGS. 4 and 5 are performed in the autonomous mobile apparatus 1, but all or some of the processes shown in FIGS. 4 and 5 may be performed in an external computer or the like.

Further, the program for realizing the processing unit 11 and the respective sections 101 to 105 shown in FIG. 2 is stored in the ROM 302 shown in FIG. 3, but may be stored in a hard disk, a solid state drive (SSD), or the like, instead of in the ROM 302, or may be downloaded from outside through the Internet or the like.

In addition, control lines and information lines that are considered to be necessary for the description are shown, but all of the control lines and the information lines are not necessarily provided in the product. In reality, it may be considered that almost all of the components are connected to each other.

REFERENCE SIGNS LIST 1 autonomous mobile apparatus
11 processing unit (autonomous mobile control device)
12 environmental sensor
13 arm (extension and contraction unit)
14 arm control device
15 attention calling device (attention calling unit)
16 camera
21 movement control unit
22, 22R, 22L motor
23, 23R, 23L wheel
24 caster
101 movement processing section
102 congestion degree estimating section
103 visual field estimating section
104 attention calling control section
105 obstacle detecting section

The invention claimed is:
1. An autonomous mobile apparatus comprising:
a congestion degree estimating section that calculates the degree of congestion in a movement direction of the autonomous mobile apparatus;
a visual field estimating section that estimates a visual field that is viewable by a moving obstacle when the degree of congestion on an immediately front side of the autonomous mobile apparatus is a predetermined value or higher;
an attention calling control section that calls attention using an attention calling device to enter the estimated visual field; and
a movement control section that moves the autonomous mobile apparatus; and
a telescopic section, at a tip of which the attention calling device is provided, wherein
the attention calling control section extends the telescopic section so that the visual field estimating section enters the estimated visual field that is viewable by the moving obstacle.
2. The autonomous mobile apparatus according to claim 1,
wherein the attention calling control section provides at least one of the movement direction and a velocity of the autonomous mobile apparatus to the attention calling device.
3. The autonomous mobile apparatus according to claim 1,
wherein the movement control section creates, when the degree of congestion on the immediately front side of the autonomous mobile apparatus is lower than the predetermined value and a crowded region of which the degree of congestion is the predetermined value or higher is present in an advancing direction of the autonomous mobile apparatus, a movement plan for moving the autonomous mobile apparatus to an immediately front side of the crowded region.
4. A control device comprising:
a movement processing section that creates a movement plan that is information relating to movement of an autonomous mobile apparatus;
a movement control section that moves the autonomous mobile apparatus according to the movement plan created by the movement processing section;
a congestion degree estimating section that calculates the degree of congestion in a movement direction of the autonomous mobile apparatus;
a visual field estimating section that estimates a visual field that is viewable by a moving obstacle when the degree of congestion on an immediately front side of the autonomous mobile apparatus, calculated by the congestion degree estimating section, is a predetermined value or higher; and
an attention calling control section that calls attention using an attention calling device to enter the estimated visual field; and a telescopic section, at a tip of which the attention calling device is provided, wherein
the attention calling control section extends the telescopic section so that the visual field estimating section enters the estimated visual field that is viewable by the moving obstacle.

5. The control device according to claim 4,
wherein the movement control section creates, when the degree of congestion on the immediately front side of the autonomous mobile apparatus is lower than the predetermined value and a crowded region of which the degree of congestion is the predetermined value or higher is present in an advancing direction of the autonomous mobile apparatus, a movement plan for moving the autonomous mobile apparatus to an immediately front side of the crowded region.

6. An autonomous mobile method in an autonomous mobile apparatus that performs autonomous movement, comprising the steps of:
calculating the degree of congestion in a movement direction of the autonomous mobile apparatus;
estimating a visual field that is viewable by a passerby when the degree of congestion on an immediately front side of the autonomous mobile apparatus, calculated by the congestion degree estimating section, is a predetermined value or higher; and
moving the autonomous mobile apparatus while calling attention using an attention calling device to enter the estimated visual field; and
providing the attention calling device at a tip of a telescopic section, wherein
the attention calling control section extends the telescopic section so that the visual field estimating section enters the estimated visual field that is viewable by the passerby.

7. The method according to claim 6,
wherein the movement control section creates, when the degree of congestion on the immediately front side of the autonomous mobile apparatus is lower than the predetermined value and a crowded region of which the degree of congestion is the predetermined value or higher is present in an advancing direction of the autonomous mobile apparatus, a movement plan for moving the autonomous mobile apparatus to an immediately front side of the crowded region.

8. An autonomous mobile apparatus comprising:
a congestion degree estimator that calculates the degree of congestion in a movement direction of the autonomous mobile apparatus;
a visual field estimator that estimates a visual field that is viewable by a moving obstacle when the degree of congestion on an immediately front side of the autonomous mobile apparatus is a predetermined value or higher;
an attention calling controller that calls attention using an attention calling device to enter the estimated visual field;
a movement controller that moves the autonomous mobile apparatus;
a telescopic member, wherein
the attention calling device is disposed a tip of the telescopic member, and
the attention calling controller extends the telescopic member so that the visual field estimator enters the estimated visual field that is viewable by the moving obstacle.

9. The autonomous mobile apparatus according to claim 8,
wherein the attention calling controller provides at least one of the movement direction and a velocity of the autonomous mobile apparatus to the attention calling device.

10. The autonomous mobile apparatus according to claim 8,
wherein the movement controller creates, when the degree of congestion on the immediately front side of the autonomous mobile apparatus is lower than the predetermined value and a crowded region of which the degree of congestion is the predetermined value or higher is present in an advancing direction of the autonomous mobile apparatus, a movement plan for moving the autonomous mobile apparatus to an immediately front side of the crowded region.

* * * * *